US012560888B2

(12) United States Patent
Morishita

(10) Patent No.: US 12,560,888 B2
(45) Date of Patent: Feb. 24, 2026

(54) IMAGE FORMING APPARATUS

(71) Applicant: KYOCERA Document Solutions Inc., Osaka (JP)

(72) Inventor: Hiroki Morishita, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 18/879,243

(22) PCT Filed: Jun. 27, 2023

(86) PCT No.: PCT/JP2023/023749
§ 371 (c)(1),
(2) Date: Dec. 26, 2024

(87) PCT Pub. No.: WO2024/004997
PCT Pub. Date: Jan. 4, 2024

(65) Prior Publication Data

US 2025/0390057 A1 Dec. 25, 2025

(30) Foreign Application Priority Data

Jun. 29, 2022 (JP) ................................ 2022-104944

(51) Int. Cl.
*G03G 21/16* (2006.01)

(52) U.S. Cl.
CPC ..... *G03G 21/1647* (2013.01); *G03G 21/1604* (2013.01); *G03G 21/1619* (2013.01);
(Continued)

(58) Field of Classification Search
CPC .......... G03G 21/1604; G03G 21/1623; G03G 21/1647; G03G 21/1619; G03G 21/1633; G03G 2221/1654; G03G 2221/169
See application file for complete search history.

(56) References Cited

U.S. PATENT DOCUMENTS

2004/0161280 A1* 8/2004 Lee ........................ B41J 29/023
400/693
2010/0080615 A1 4/2010 Kikuchi
(Continued)

FOREIGN PATENT DOCUMENTS

JP H03239265 A 10/1991
JP 2005157113 A 6/2005
(Continued)

*Primary Examiner* — Joseph S Wong
(74) *Attorney, Agent, or Firm* — IP Business Solutions, LLC.

(57) ABSTRACT

An image forming apparatus includes a restriction mechanism that restricts movement of a pin of an image formation unit within a cutaway of a housing, wherein the restriction mechanism includes: a pressing lever pivotally movable from a position of abutment on the pin at lateral to the cutaway toward a direction away from the cutaway; an opening/closing lever pivotally movable with a closing movement of the cover; and an elastic member disposed in an elastically deformed state between the pressing lever and the opening/closing lever to apply to the pressing lever a load opposite to the direction away from the cutaway, wherein when the cover is open, the elastic member applies a first load to the pressing lever, and wherein when the cover is closed, the opening/closing lever pivotally moves to further elastically deform the elastic member and thus apply to the pressing lever a second load greater than the first load.

4 Claims, 17 Drawing Sheets

(52) U.S. Cl.
CPC ..... *G03G 21/1623* (2013.01); *G03G 21/1633* (2013.01); *G03G 2221/1654* (2013.01); *G03G 2221/169* (2013.01)

(56) References Cited

U.S. PATENT DOCUMENTS

| | | | | |
|---|---|---|---|---|
| 2011/0052253 | A1 | 3/2011 | Nieda | |
| 2019/0064728 | A1* | 2/2019 | Shima ................ | G03G 21/1638 |
| 2020/0209797 | A1* | 7/2020 | Ikegami ............ | G03G 15/6552 |

FOREIGN PATENT DOCUMENTS

| | | | |
|---|---|---|---|
| JP | 2011053281 | A | 3/2011 |
| JP | 2016035587 | A | 3/2016 |

* cited by examiner

IMAGE FORMING APPARATUS

TECHNICAL FIELD

The present invention relates to image forming apparatuses including a drawable image formation unit.

BACKGROUND ART

In an image forming apparatus, an image formation unit is fitted in a predetermined position inside a housing and provided drawably from the housing in order to meet maintenance or the like.

For example, Patent Literature 1 discloses an image forming apparatus including a support member that supports a process cartridge (corresponding to an image formation unit) and is movable between an inside position located inside an apparatus body (corresponding to a housing) and an outside position located outside the apparatus body.

CITATION LIST

Patent Literature

Patent Literature 1: JP-A-2016-035587

SUMMARY OF INVENTION

If, in an image forming apparatus having such a structure as described above, the process cartridge located in the inside position falls out of position, the toner image to be transferred to an intermediate transfer belt is misaligned, which may cause an image defect. Therefore, it is necessary to position the process cartridge with respect to the apparatus body to avoid cogging.

In view of the above circumstances, the present invention has an object of providing an image forming apparatus capable of securely preventing an image formation unit from falling out of position.

An image forming apparatus according to an aspect of the present invention includes: a housing with an opening in a side surface thereof; a cover capable of opening and closing the opening; an image formation unit disposed in an interior of the housing and capable of being pulled out through the opening along a predetermined direction of pullout; a cutaway formed at a lateral edge of the opening along the direction of pullout; a pin provided on the image formation unit and capable of abutting against a bottom of the cutaway to position the image formation unit with respect to the housing; and a restriction mechanism that restricts movement of the pin within the cutaway, wherein the restriction mechanism includes: a pressing lever pivotally movable from a position of abutment on the pin at lateral to the cutaway toward a direction away from the cutaway; an opening/closing lever pivotally movable with a closing movement of the cover; and an elastic member disposed in an elastically deformed state between the pressing lever and the opening/closing lever to apply to the pressing lever a load opposite to the direction away from the cutaway, wherein when the cover is open, an elastic restoring force of the elastic member causes a first load to be applied to the pressing lever, and wherein when the cover is closed, the opening/closing lever pivotally moves to further elastically deform the elastic member and, thus, an elastic restoring force of the elastic member causes a second load greater than the first load to be applied to the pressing lever.

Advantageous Effects of Invention

In the present invention, an appropriate load is applied to the pressing lever in each of a closed state and an open state of the cover. Therefore, even if an external force, such as vibration or impact, is applied to the housing, the pivotal movement of the pressing lever is restricted to prevent unnecessary movement of the pin of the image formation unit.

DESCRIPTION OF EMBODIMENTS

Figure 1:
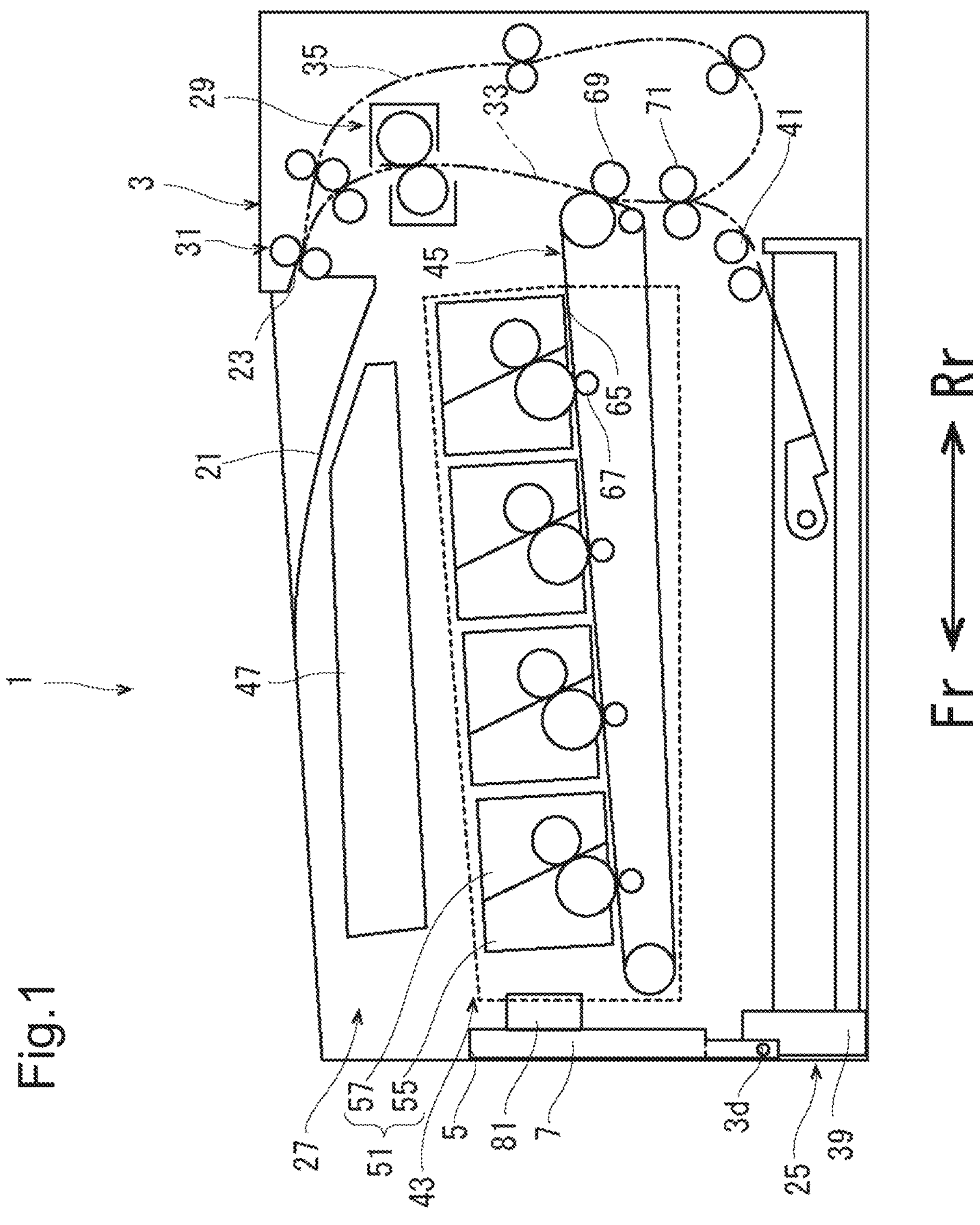
FIG. 1 is a side view schematically showing an internal structure of an image forming apparatus according to one embodiment of the present invention.

Hereinafter, a description will be given of an image forming apparatus according to one embodiment of the present invention with reference to the drawings. Hereinafter, directions of rotation and right, left, upward and downward directions may be shown, but they are shown only as examples in the drawings unless otherwise stated.

Figure 2:
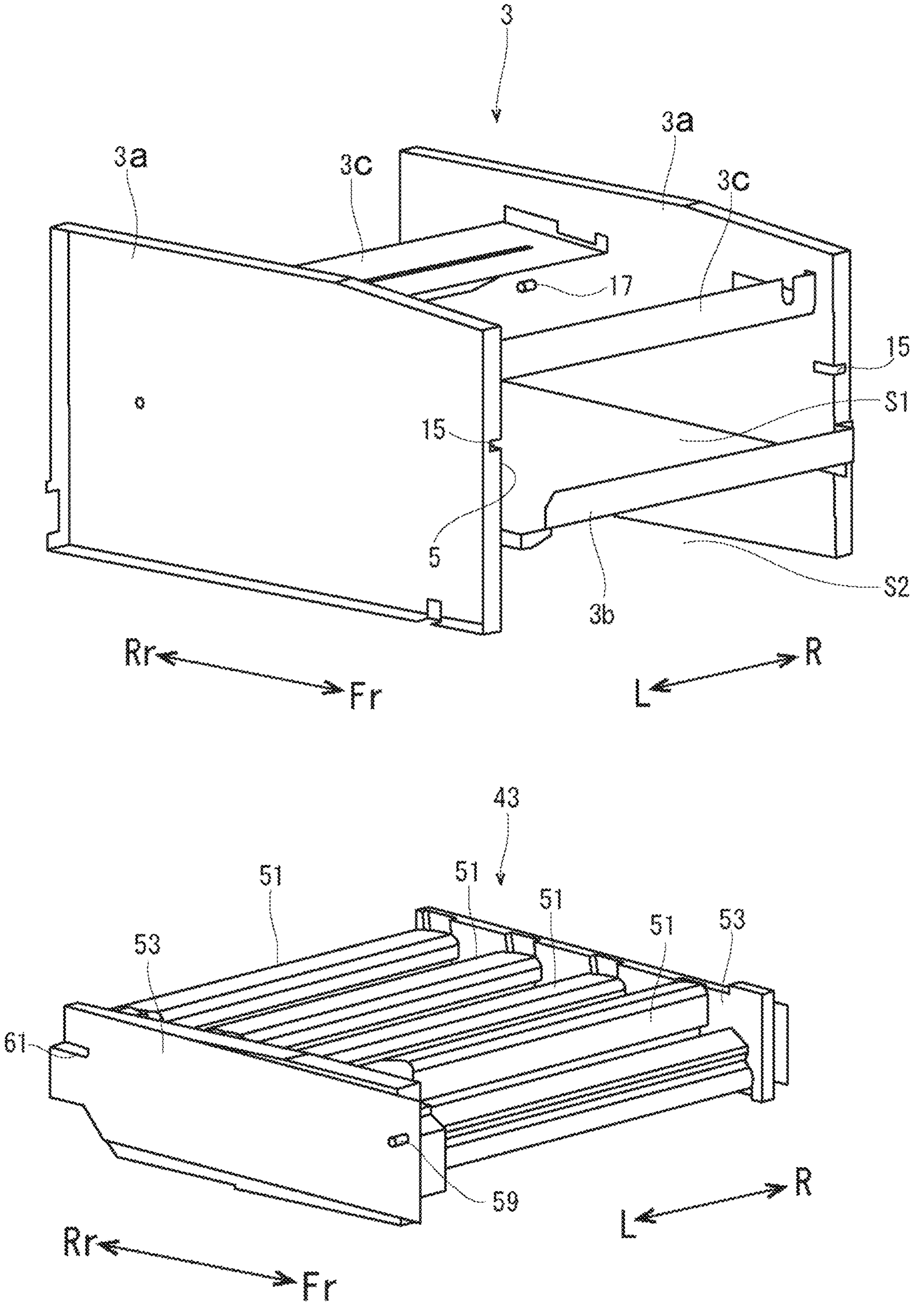
FIG. 2 is a perspective view showing a housing and an image formation unit of the image forming apparatus according to the one embodiment of the present invention.
Figure 3:
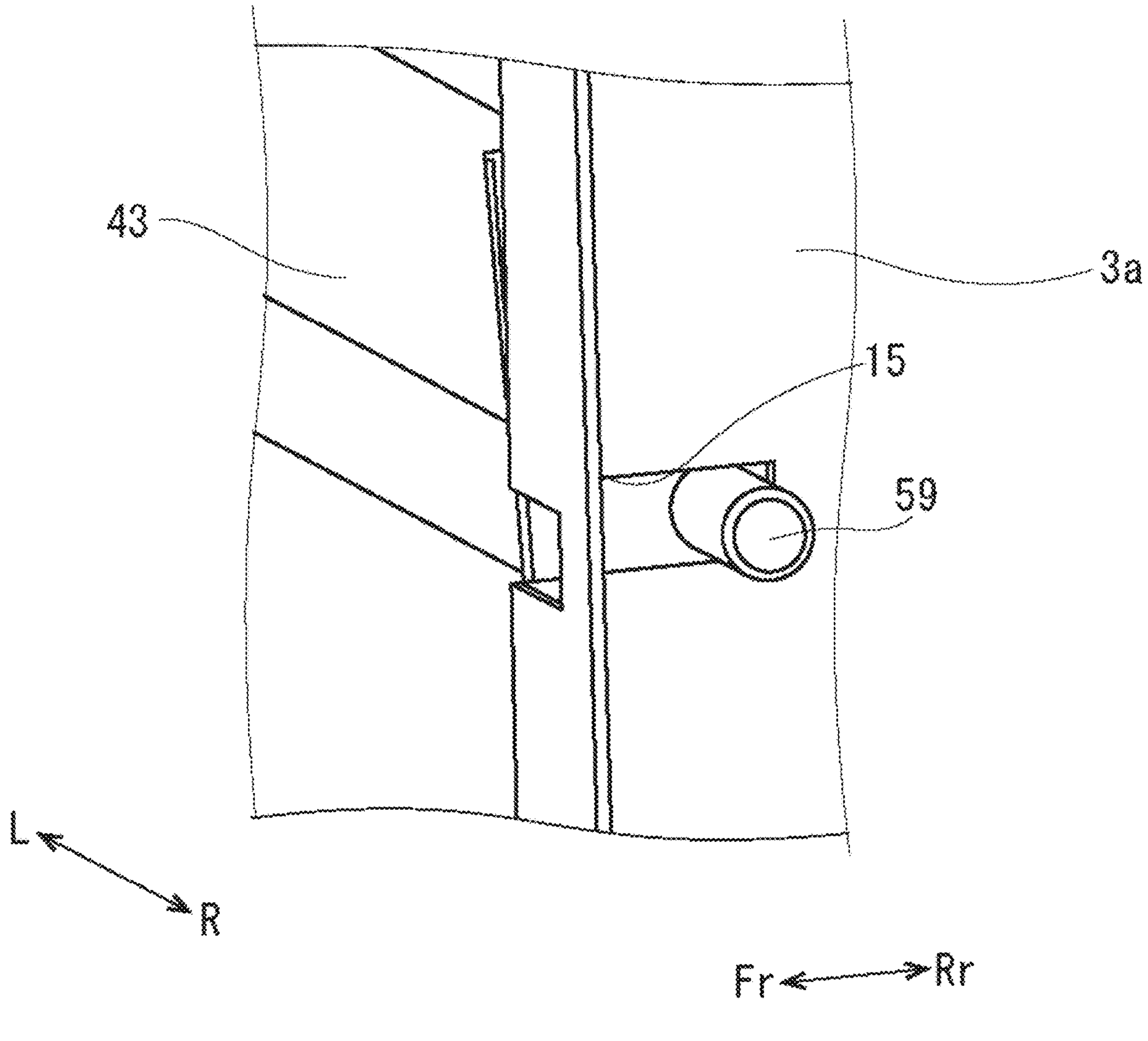
FIG. 3 is a perspective view showing a pin of the image formation unit and a cutaway of the housing in the image forming apparatus according to the one embodiment of the present invention.
Figure 4:
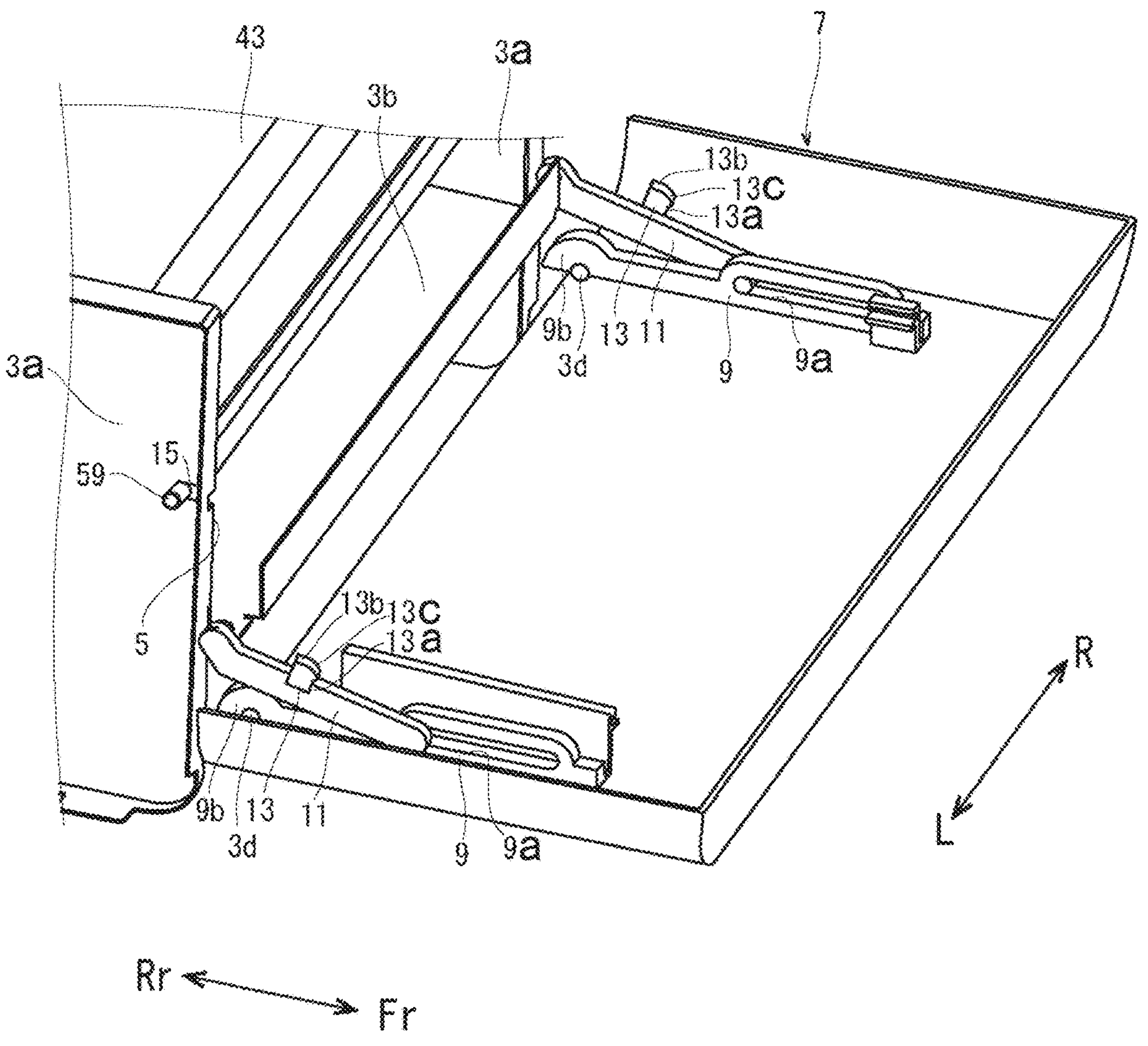
FIG. 4 is a perspective view showing a cover of the image forming apparatus according to the one embodiment of the present invention.

First, a description will be given of a first embodiment of an image forming apparatus 1. With reference to FIGS. 1 to 4, the image forming apparatus 1 will be described. FIG. 1 is a side view schematically showing an internal structure of the image forming apparatus 1, FIG. 2 is a perspective view showing a housing 3 and an image formation unit 43 of the image forming apparatus 1, FIG. 3 is a perspective view showing a pin 59 of the image formation unit 43 and a cutaway 15 of the housing 3, and FIG. 4 is a perspective view showing a front cover 7. The symbols Fr, Rr, L, and R shown in the drawings represent the front, rear, left, and right sides, respectively, of the image forming apparatus 1.

The housing 3 of the image forming apparatus 1 includes, as shown in FIG. 2, right and left side panels 3*a* disposed opposite to each other in the right-to-left direction, a partition panel 3*b* connecting the right and left side panels 3*a*, and front and rear stays 3*c* each connecting the right and left side panels 3*a*. The partition panel 3*b* partitions the space between the right and left side panels 3*a* into an upper space S1 and a lower space S2. The front and rear stays 3*c* are disposed, within the upper space S1, apart from each other in the front-to-rear direction. An opening 5 facing the front of the upper space S1 corresponds to the opening according to the present invention.

As shown in FIG. 1, the opening 5 can be opened and closed by the front cover 7. The front cover 7 is an example of the cover according to the present invention capable of opening and closing the opening. As shown in FIG. 4, the front cover 7 has a width wider than the opening 5 and a height higher than the opening 5. The right and left lateral edges and upper edge of the front cover 7 are bent inwardly. The inside surface of the front cover 7 is provided at right and left ends with right and left restriction members 9 along the heightwise direction of the front cover 7. The right and left restriction members 9 have respective elongated holes 9*a* formed along the longitudinal direction. The right and left restriction members 9 include respective semicircular supports 9*b* formed at the lower ends thereof.

The front cover 7 is pivotally supported to the right and left side panels 3*a*. The right and left side panels 3*a* are provided, below the partition panel 3*b*, with respective fulcrums 3*d* of cover pivoting (see also FIG. 1). The right and left supports 9*b* of the front cover 7 are pivotally supported by the respective fulcrums 3*d* of cover pivoting. The front cover 7 pivotally moves between a closed position where it stands upright from the fulcrums 3*d* of cover pivoting to close the opening 5 and an open position where it pivotally moves from the fulcrums 3*d* of cover pivoting to a horizontal plane to open the opening 5.

The front cover 7 is held in the open position by stoppers 11. One ends of the stoppers 11 are pivotally supported, above the fulcrums 3*d* of cover pivoting, to the right and left side panels 3*a*, while the other ends of the stoppers 11 are supported movably within the elongated holes 9*a* of the restriction members 9. When the other ends of the stoppers 11 are engaged against the respective ends of the elongated holes 9*a* closer to the fulcrums 3*d* of cover pivoting, the front cover 7 is held in the open position. The side surfaces of the stoppers 11 are provided at their longitudinally middle portions with respective lugs 13 projecting toward the internal space of the housing 3 along a direction orthogonal to the longitudinal direction. The lugs 13 are in a rectangular shape having a predetermined thickness in the right-to-left direction and each lug 13 has a top surface 13*a*, a distal end surface 13*b*, and an inclined surface 13*c* located between the top surface 13*a* and the distal end surface 13*b* (see also FIG. 6).

Furthermore, as shown in FIG. 2, the right and left lateral edges of the opening 5 (i.e., the right and left side panels 3*a*) are provided with respective cutaways 15 of a predetermined length formed along the horizontal direction. Respective rear side portions of the right and left side panels 3*a* are provided with respective pins 17 projecting from the inside surfaces of the panels 3*a*. The pins 17 are provided at the same height as the cutaways 15.

The right and left lateral edges of the opening 5 (i.e., the right and left side panels 3*a*) are further provided with respective restriction mechanisms 81 (see FIG. 1, not shown in FIG. 2) that press respective associated pins of an image formation unit to be described hereinafter toward the bottoms of the cutaways 15. The restriction mechanism 81 will be described hereinafter. The restriction mechanisms 81 are provided, at respective locations where the stoppers 11 are provided, opposite to the respective stoppers 11.

Referring to FIG. 1 again, a top plate of the housing 3 is provided with a sheet output tray 21 and an ejection opening 23 for sheets is provided at the rear of the sheet output tray 21.

The housing 3 contains a sheet feed device 25, an image forming device 27 of electrophotographic type, a fixing device 29, and an ejection device 31. Furthermore, the housing 3 is provided, throughout the lower space S2 and the upper space S1, with a main conveyance path 33 for sheets and an inversion path 35 for sheets.

The sheet feed device 25 includes: a sheet feed cassette 39 disposed in the lower space S2 and capable of containing sheets; and a sheet feeder 41 that feeds a sheet from the sheet feed cassette 39 to the main conveyance path 33. The sheet feed cassette 39 can be loaded and unloaded in the front-to-rear direction through an opening located at the front of the lower space S2. The sheet feeder 41 is disposed in a rear side portion of the lower space S2.

The image forming device 27 includes an image formation unit 43, an intermediate transfer device 45, and an exposure device 47, all of which are disposed in the upper space S1.

The image formation unit 43 includes: four individual units 51 for four colored toners (yellow, magenta, cyan, and black); and right and left unit frames 53 supporting the four individual units 51. Each of the individual units 51 includes: a drum unit 55 containing a photosensitive drum on which an electrostatic latent image is to be formed; and a development unit 57 that develops the electrostatic latent image into a toner image by a one-component developing method. The four individual units 51 are arranged side by side in the front-to-rear direction and removably supported to the right and left unit frames 53.

Each of the right and left unit frames 53 includes a pin 59 formed thereon and a cutaway 61 formed therein. The pins 59 are formed to project laterally from the respective front ends of the outside surfaces of the right and left unit frames 53. The cutaways 61 are formed along the front-to-rear direction at the respective rear edges of the right and left unit frames 53. The cutaways 61 are formed at the same height as the pins 59.

The image formation unit 43 is positioned with respect to the housing 3 in a manner that the pins 59 are allowed to abut against the bottoms (rear ends) of the cutaways 15 in the right and left side panels 3*a* (see FIG. 3) and the pins 71 on the right and left side panels 3*a* are allowed to abut against the bottoms (front ends) of the cutaways 61. Meanwhile, the image formation unit 43 can be pulled out frontward through the opening 5. As seen from this, the direction of pullout of the image formation unit 43 is a direction toward the front along the horizontal direction. When the toner is consumed and the associated development unit 57 needs to be replaced or upon maintenance of the image formation unit 43, the image formation unit 43 is pulled out of and removed from the housing 3.

The intermediate transfer device 45 includes an endless intermediate transfer belt 65, four primary transfer rollers 67 associated with the respective four individual units 51, and a secondary transfer roller 69. The intermediate transfer belt 65 is wrapped around drive and driven rollers disposed apart from each other in the front-to-rear direction, and a tension roller. The four primary transfer rollers 67 are disposed, in the hollow of the intermediate transfer belt 65, in line in the front-to-rear direction. The secondary transfer roller 69 is disposed rearward of the intermediate transfer belt 65. A secondary transfer nip is formed between the intermediate transfer belt 65 and the secondary transfer roller 69.

The intermediate transfer device 45 is disposed below the image formation unit 43 and secured to the partition panel 3*b*. Specifically, the height of the right and left unit frames 53 of the image formation unit 43 is higher than those of the individual units 51 to create a given space below the individual units 51 and between the unit frames 53. The intermediate transfer device 45 is disposed in this space. As shown in FIG. 1, the four primary transfer rollers 67 of the intermediate transfer device 45 are opposed to the respective associated photosensitive drums of the drum units 55 of the four individual units 51 of the image formation unit with the intermediate transfer belt 65 in between, thus forming respective primary transfer nips between the intermediate transfer belt 65 and the associated photosensitive drums. The exposure device 47 is supported above the image formation unit 47 to the front and rear stays 3*c*.

The fixing device 29 includes a pressure roller and a heat roller and forms a fixing nip between both the rollers. As shown in FIG. 1, the fixing device 29 is disposed above the secondary transfer nip. The ejection device 31 is disposed above the fixing device 29 and inwardly of the ejection opening 23.

The main conveyance path 33 is formed from the sheet feeder 41 of the sheet feed device 25 via the secondary transfer nip and the fixing nip to the ejection device 31. In the main conveyance path 33, a registration roller pair 71 is disposed between the sheet feeder 41 and the secondary transfer nip. The inversion path 35 branches off from the main conveyance path 33 at a location downstream of the fixing device 29 in the direction of sheet conveyance and merges into the main conveyance path 33 at a location upstream of the registration roller pair 71.

Next, a description will be given briefly of an image formation operation. In the image forming device 27, respective toner images are formed on the individual units 51 of the image formation unit 43 based on image data on which the individual units 51 have been exposed with light by the exposure device 47. The toner images are transferred at the respective associated primary transfer nips from the individual units 51 to the intermediate transfer belt 65. Thus, a full-color toner image is formed on the intermediate transfer belt 65.

Meanwhile, in the sheet feed device 25, a sheet is conveyed from the sheet feed cassette 39 to the main conveyance path 33 by the sheet feeder 41. The sheet is conveyed to the secondary transfer nip with an appropriate timing by the registration roller pair 71. At the secondary transfer nip, the toner image formed on the intermediate transfer belt 65 is transferred to one side of the sheet. The sheet is conveyed to the fixing device 29 along the main conveyance path 33 and the toner image is then fixed, at the fixing nip, onto the sheet. The sheet is further conveyed to the ejection device 31 and ejected through the ejection opening 23 to the sheet output tray 21 by the ejection device 31.

In the case of duplex printing, the sheet with a toner image formed on one side is conveyed from the main conveyance path 33 to the inversion path 35 and a toner image is then transferred, at the secondary transfer nip, to the other side of the sheet. Thereafter, the toner image is fixed onto the other side of the sheet by the fixing device 29, then conveyed to the ejection device 31, and ejected through the ejection opening 23 to the sheet output tray 21 by the ejection device 31.

Figure 5:
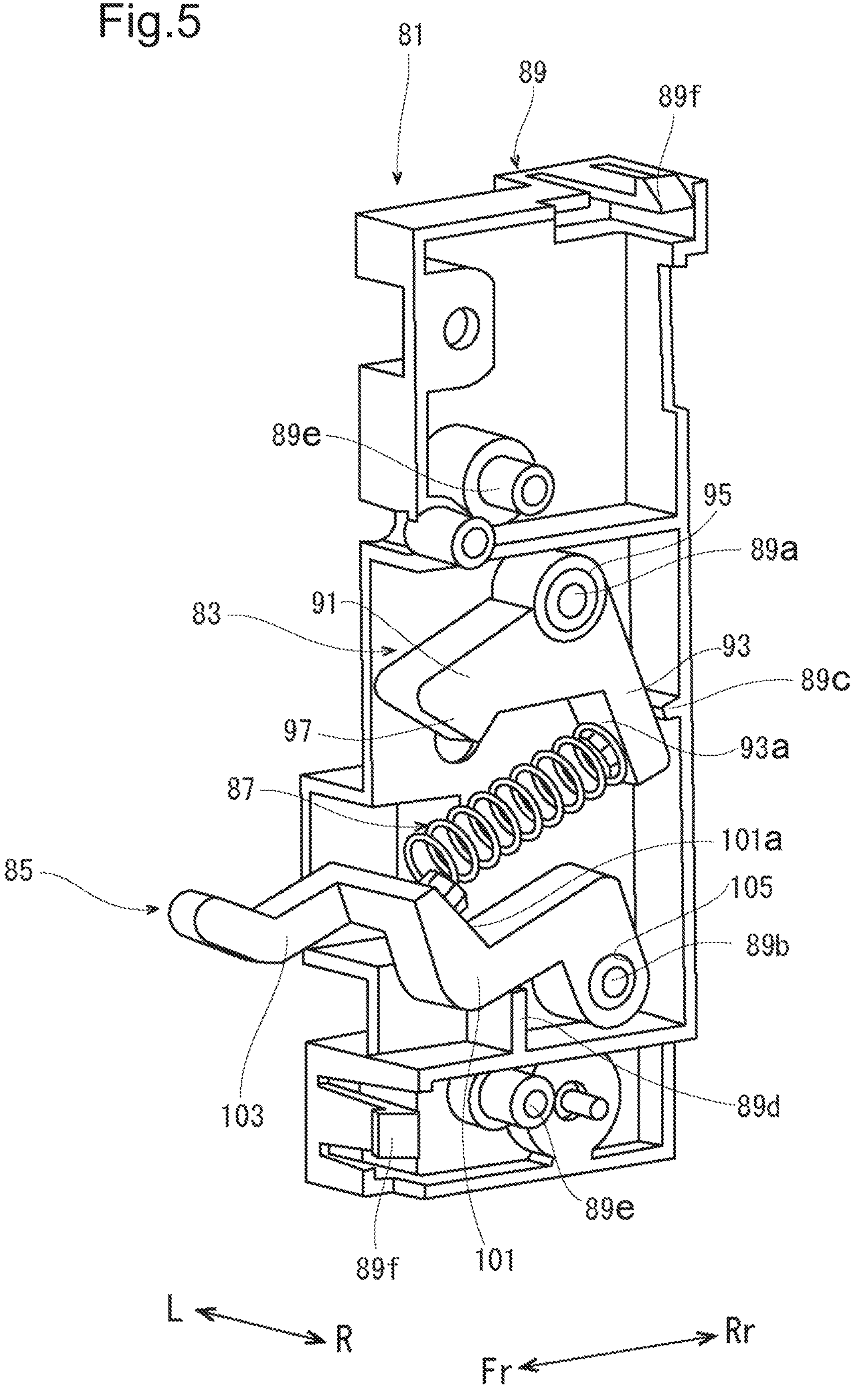
FIG. 5 is a perspective view showing a first example of a restriction mechanism of the image forming apparatus according to the one embodiment of the present invention.
Figure 6:
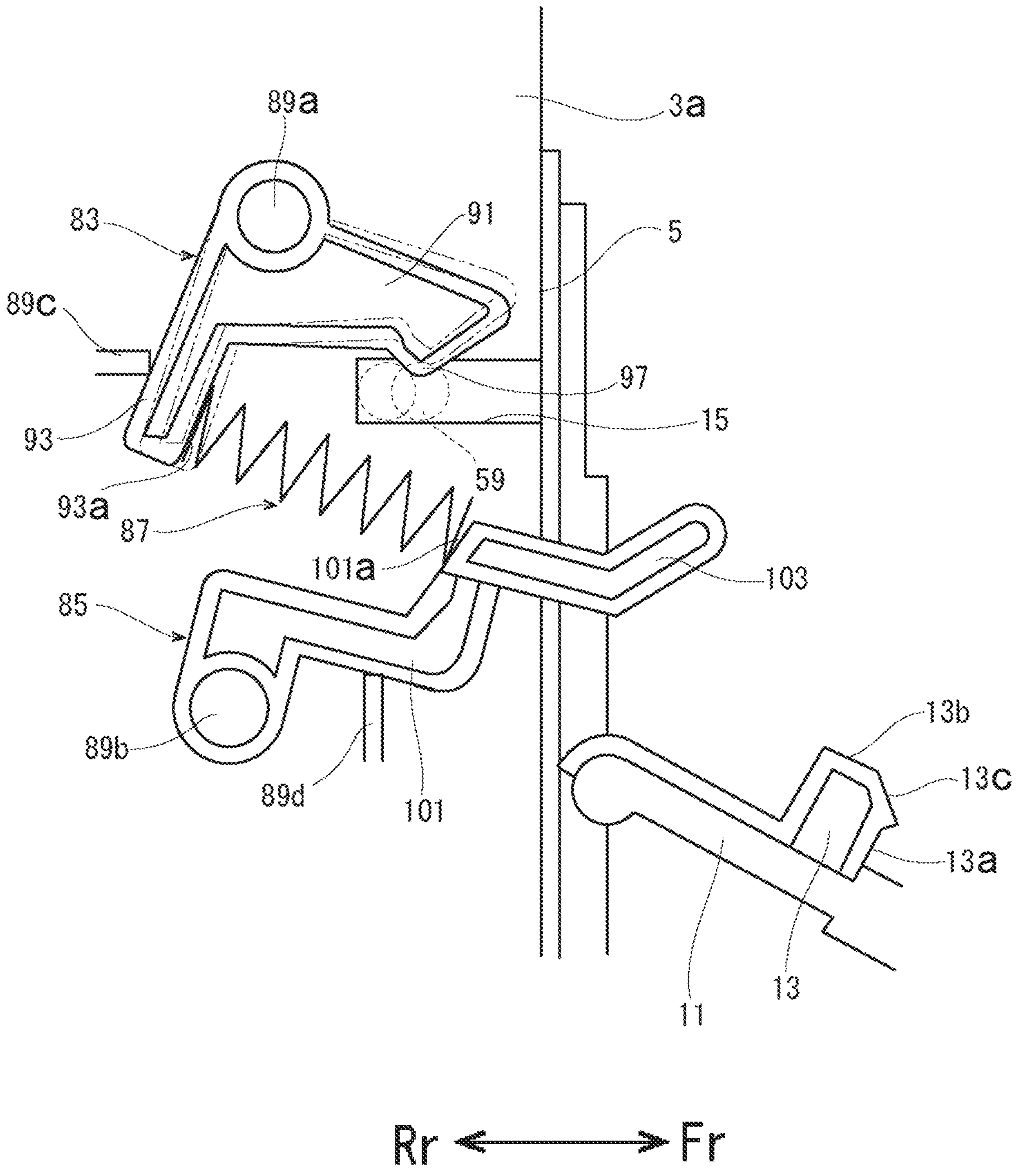
FIG. 6 is a side view showing the first example of the restriction mechanism of the image forming apparatus according to the one embodiment of the present invention.

Next, a description will be given of the restriction mechanisms 81 with reference to FIGS. 5 and 6. FIG. 5 is a perspective view showing the restriction mechanism 81 and FIG. 6 is a side view showing the restriction mechanism 81 mounted to the side panel 3*a*. FIG. 5 shows the restriction mechanism 81 to be mounted to the left side panel 3*a*.

As shown in FIG. 5, the restriction mechanism 81 includes a pressing lever 83, an opening/closing lever 85, a compression coil spring 87 serving as an elastic member, and a support plate 89 supporting these components. A bottom panel of the support plate 89 is provided with upper and lower pivot pins 89*a*, 89*b*. A rear panel of the support plate 89 is provided with an upper restricting portion 89*c* projecting inwardly between both the pivot pins 89*a*, 89*b*. Furthermore, a lower panel of the support plate 89 is provided with a lower restricting portion 89*d* projecting upward. The support plate 89 is further provided with a plurality of positioning pins 89*e* and a plurality of hooks 89*f*. Meanwhile, the outside surfaces of the right and left side panels 3*a* are provided with positioning holes and engaging elements (not shown) associated with the positioning pins 89*a* and the hooks 89*f*, respectively. The support plate 89 is mounted to predetermined positions of the right and left side panels 3*a* by fitting the positioning pins 89*a* of the support plate 89 into the positioning holes in the right and left side panels 3*a* and engaging the hooks 89*f* with the engaging elements.

The pressing lever 83 is a member in an approximately L-shape when viewed from the right-to-left direction and includes a pressing arm 91 and a restriction arm 93 meeting at substantially 90 degrees and a bearing hole 95 located between both the arms 91, 93. The pressing arm 91 includes a raised portion 97 formed on the inside surface of a distal end portion thereof (the surface thereof facing the restriction arm 93) and having a triangular shape when viewed from the right-to-left direction. The restriction arm 93 has a spring support surface 93*a* formed at a distal end portion thereof and oriented diagonally downward. The pressing lever 83 is pivotally supported, with the pressing arm 91 oriented frontward and the restriction arm 93 oriented rearward, by the upper pivot pin 89*a* of the support plate 89. The restriction arm 93 abuts the upper restricting portion 89*c* of the support plate 89 from below and is thus restricted in upward pivotal movement. Thus, the pressing arm 91 is held in a position where the raised portion 97 is oriented directly downward, and restricted in downward pivotal movement, but allowed for upward pivotal movement.

The opening/closing lever 85 is a member in a zigzag shape when viewed from the right-to-left direction in FIG. 5 and includes: a restriction portion 101 in an approximately Z-shape when viewed from the right-to-left direction in FIG. 5; and an abutment portion 103 joined to the distal end of the restriction portion 101 and having an approximately L-shape when viewed from the right-to-left direction. A bearing hole 105 is formed in a basal end portion of the restriction portion 101 and a spring support surface 101*a* oriented diagonally upward is formed at a distal end portion of the restriction portion 101. The abutment portion 103 is formed to bend obtusely when viewed from the right-to-left direction. The opening/closing lever 85 is pivotally supported, with the abutment portion 103 oriented frontward, by the lower pivot pin 89*b* of the support plate 89. The restriction portion 101 abuts the lower restricting portion 89*d* of the support plate 89 from above and is thus restricted in downward pivotal movement. Thus, the opening/closing lever 85 is held in a position where the abutment portion 103 extends out frontward beyond the support plate 89.

The compression coil spring 87 is a so-called pressing spring, wherein one end thereof is fitted to a projection of the spring support surface 93*a* of the restriction arm 93 of the pressing lever 83 and the other end is fitted to a projection of the spring support surface 101*a* of the restriction portion 101 of the opening/closing lever 85. Since, as described above, the restriction arm 93 of the pressing lever 83 is restricted in upward pivotal movement and the restriction portion 101 of the opening/closing lever 85 is restricted in downward pivotal movement, the positions of both the spring support surfaces 93*a*, 101*a* are fixed. The compression coil spring 87 is slightly compressed between both the spring support surfaces 93*a*, 101*a*. Thus, an elastic restoring force of the compression coil spring 87 produced by compression thereof is applied to the restriction arm 93 of the pressing lever 83 to press the restriction arm 93 against the upper restricting portion 89*c*. In other words, an upward load is applied to the restriction arm 93, while a downward load is applied to the pressing arm 91. The load applied to the pressing arm 91 is referred to as a first load.

As shown in FIG. 6, when the support plates 89 are mounted to the predetermined positions on the outside surfaces of the right and left side panels 3*a*, the raised portions 97 of the pressing arms 91 of the pressing levers 83 project laterally to the respective cutaways 15 in the right and left side panels 3*a* from above. Furthermore, the abutment portions 103 of the opening/closing levers 85 project frontward through the opening 5. These positions of the pressing levers 83 and the opening/closing levers 85 are assumed as initial positions of the pressing levers 83 and the opening/closing levers 85. The pressing arms 91 are subjected to the first load and thus restricted in upward pivotal movement, i.e., pivotal movement away from the cutaways 51. As just described, the first load is applied to the pressing arms 91 along the direction (downward direction) opposite to the direction away from the cutaways 15.

A description will be given of the operation of the restriction mechanisms 81 in the image forming apparatus 1 having the above structure with reference to FIGS. 6 and 7 to 10. FIGS. 7 to 10 are side views showing the restriction mechanism 81.

Figure 7:
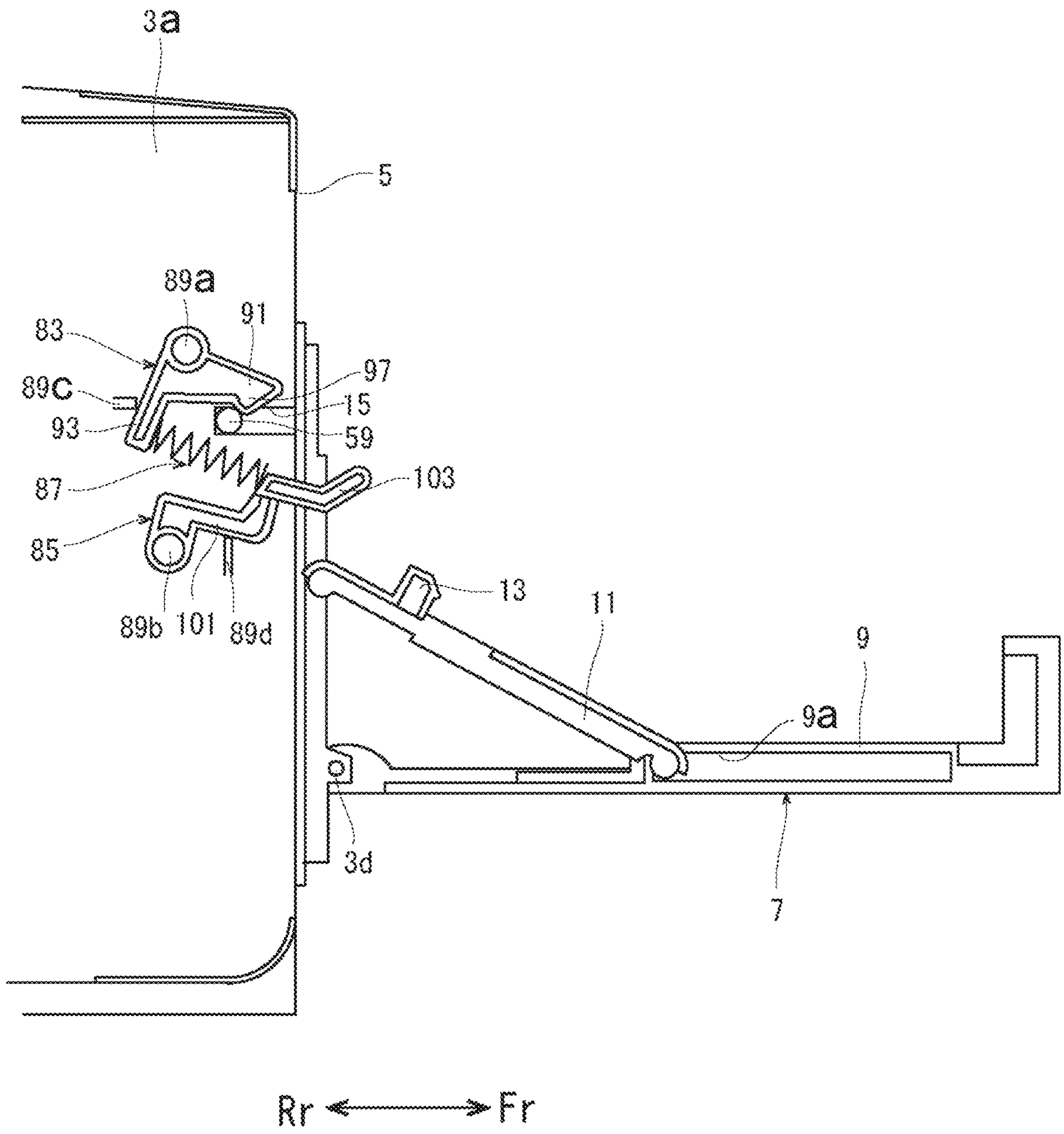
FIG. 7 is a side view showing the first example of the restriction mechanism of the image forming apparatus according to the one embodiment of the present invention when a front cover is open.

First, a description will be given of a state where the image formation unit 43 is pulled out of the housing 3. In a state where the image formation unit 43 is pulled out of the housing 3, as shown in FIGS. 6 and 7, the front cover 7 is opened and the pressing levers 83 and the opening/closing levers 85 of the restriction mechanisms 81 are held in their initial positions. Specifically, the restriction arms 93 abut the upper restricting portions 89*c*, the restriction portions 101 abut the lower restricting portions 89*d*, the raised portions 97 of the pressing arms 91 of the pressing levers 83 project laterally to the cutaways 15 from above, and the abutment portions 103 of the opening/closing levers 85 project frontward through the opening 5.

In fitting the image formation unit 43 into the housing 3 through the opening 5, as described previously, the pins 17 on the right and left side panels 3*a* enter the cutaways 61 in the right and left unit frames 53 of the image formation unit 43, and concurrently the pins 59 on the image formation unit 43 enter the cutaways 15 in the right and left side panels 3*a*. In doing so, the rear sides of the pins 59 having projected through the cutaways 15 to the outside of the side panels 3*a* abut the raised portions 97 of the pressing arms 91. As described previously, the pressing arms 91 are subjected to the first load along the downward direction (the direction opposite to the direction away from the cutaways 15). While the pins 59 pass inwardly through the cutaways 15, the pressing arms 91 are pushed up against the first load by the pins 59 (see the dash line in FIG. 6) and thus pivotally move upward (see the dash-double-dot line in FIG. 6). As just described, the pressing levers 83 pivotally move counterclockwise in FIG. 6 and the restriction arms 93 move downward away from the upper restricting portions 89*c*. When the pins 59 abut the rear ends (bottoms) of the cutaways 15, the pins 59 pass over the apexes of the raised portions 97 and, thus, the pressing arms 91 pivotally move downward under the first load. In other words, the pressing levers 83 pivotally move clockwise in FIG. 6 and the raised portions 97 abuts the front sides of the pins 59.

When the pressing levers 83 return to the initial positions, the inclined rear surfaces of the raised portions 97 abut the front sides of the pins 59 to press the pins 59 against the rear ends (bottoms) of the cutaways 15, thus restricting the movement of the pins 59. The pressing arms 91 are subjected to the first load along the downward direction (the direction opposite to the direction away from within the cutaways 15) and thus restricted in upward pivotal movement.

Figure 8:
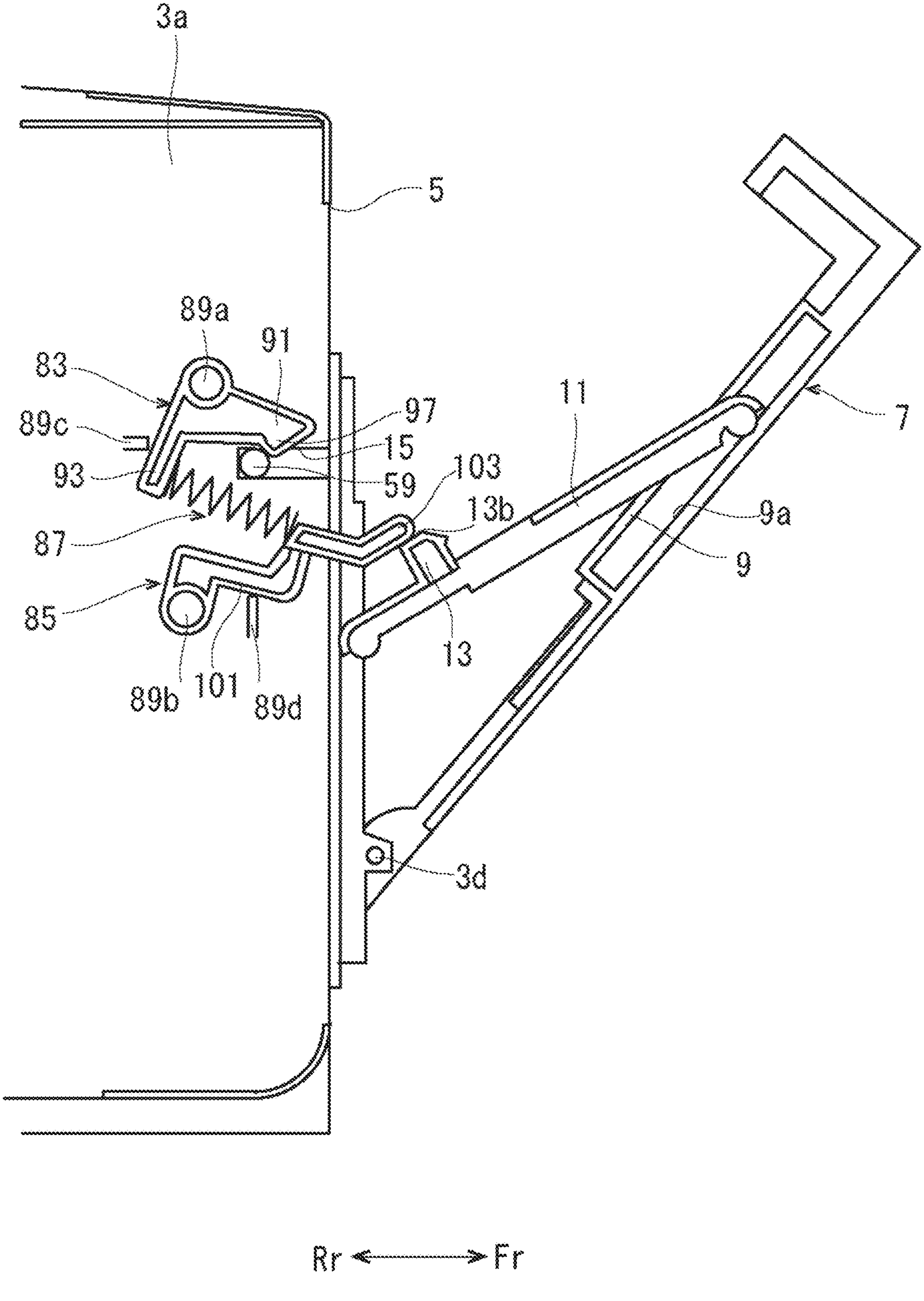
FIG. 8 is a side view showing the first example of the restriction mechanism of the image forming apparatus according to the one embodiment of the present invention when the front cover is moving toward a closed position.
Figure 9:
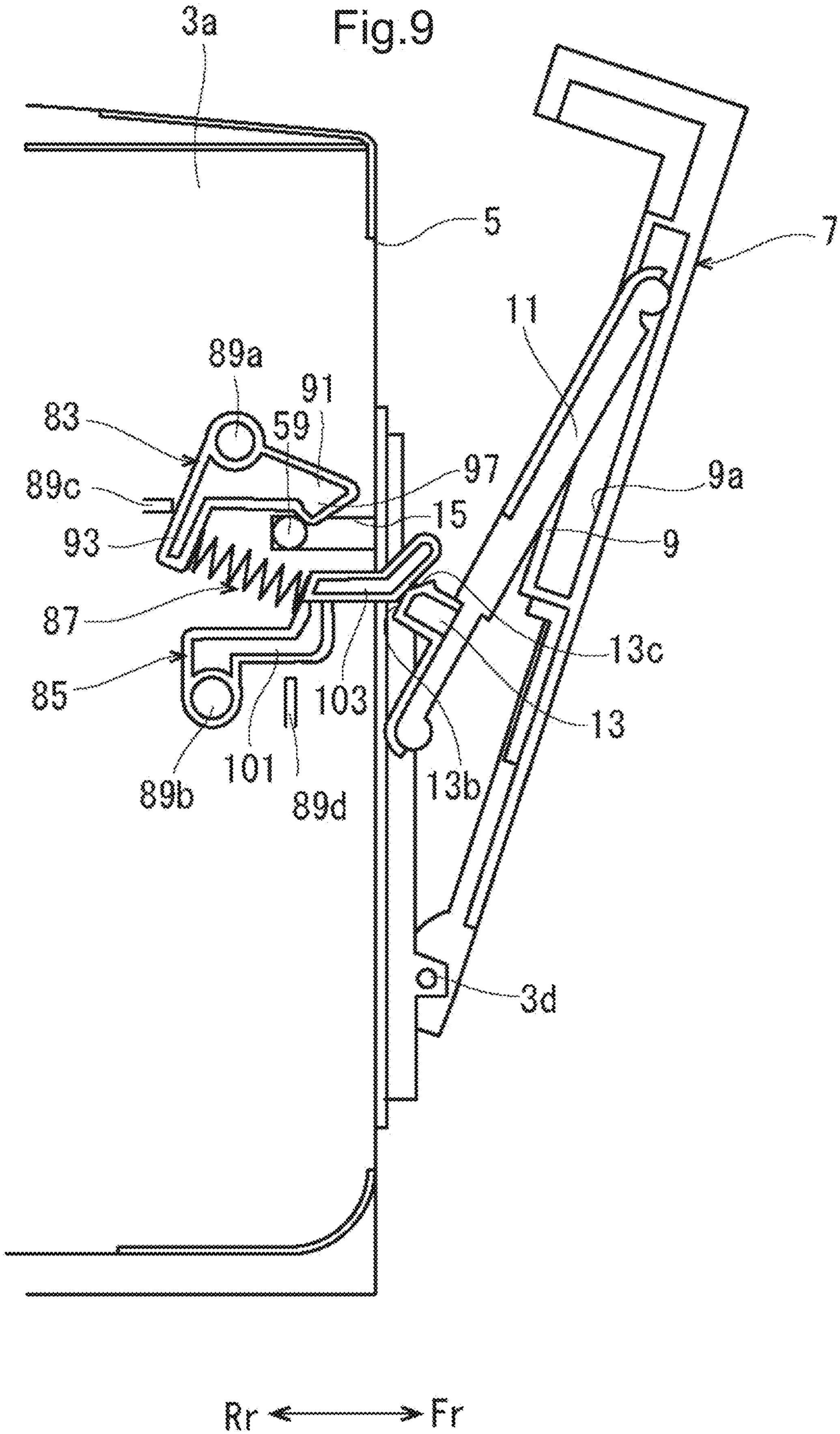
FIG. 9 is a side view showing the first example of the restriction mechanism of the image forming apparatus according to the one embodiment of the present invention when the front cover is further moving toward the closed position.
Figure 10:
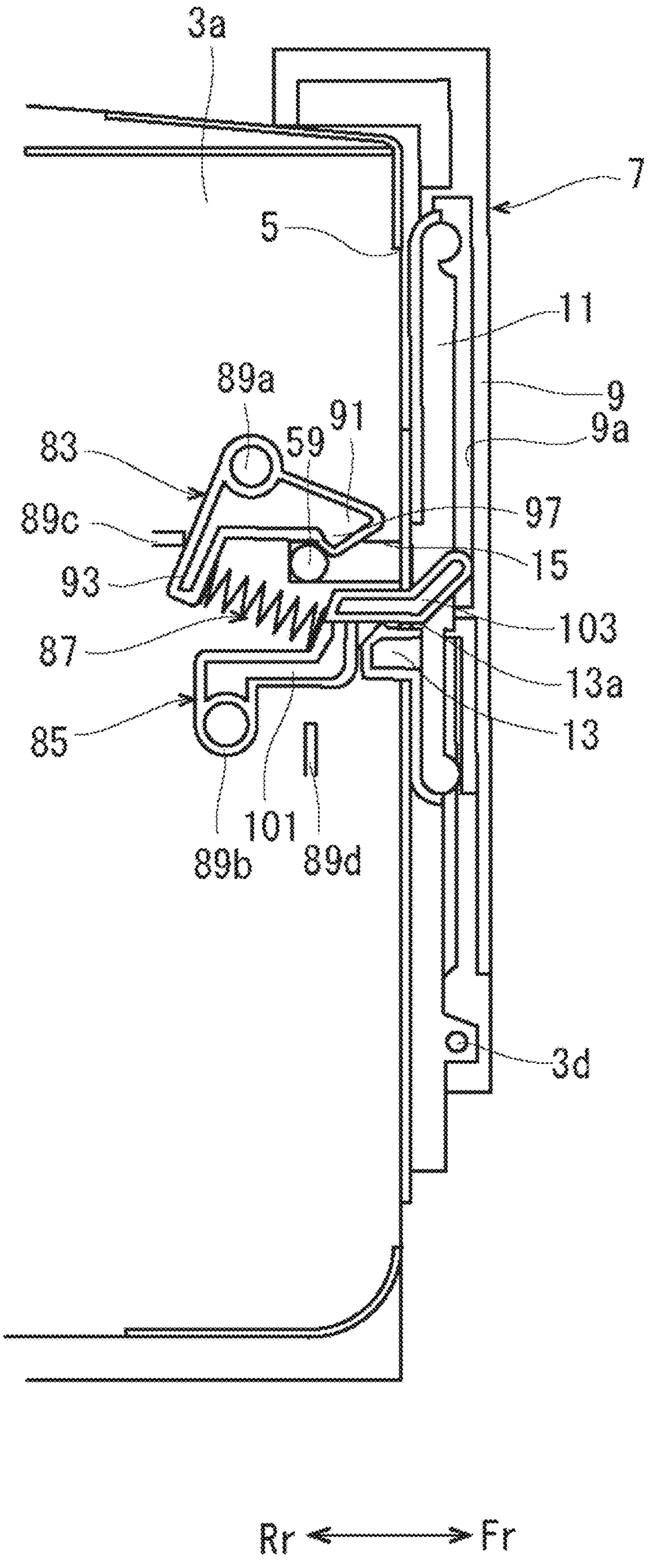
FIG. 10 is a side view showing the first example of the restriction mechanism of the image forming apparatus according to the one embodiment of the present invention when the front cover is closed.

After the image formation unit 43 is fitted into the housing 3, the front cover 7 is pivotally moved upward in order to close the opening 5. When the front cover 7 is pivotally moved upward, as shown in FIG. 8, the abutment portions 103 of the opening/closing levers 85 abut the lugs 13 of the stoppers 11 of the front cover 7 from below. Specifically, the distal end surfaces 13*b* of the lugs 13 abut the under surfaces of the abutment portions 103. When the front cover 7 is further pivotally moved upward, as shown in FIG. 9, the opening/closing levers 85 are pushed up by the lugs 13, thus moved away from the lower restricting portions 89*d*, and start to pivotally move upward. Specifically, the under surfaces of the abutment portions 103 make sequential contact with the distal end surfaces 13*b*, the inclined surfaces 13*c*, and the top surfaces 13*a* of the lugs 13 in this order. When the opening 5 is fully closed by the front cover 7 as shown in FIG. 10, the abutment portions 103 climb on the lugs 13.

When the opening/closing levers 85 pivotally moves upward in this manner, the compression coil springs 87 start to be compressed between both the spring support surfaces 93*a*, 101*a*. Thus, the elastic restoring force of the compression coil springs 87 produced by the compression thereof increases, resulting in an increased load applied to the pressing arms 91. This load is referred to as a second load. The second load is greater than the first load by an elastic restoring force of the compression coil springs 87 produced by elastic deformation thereof due to pivotal movement of the opening/closing levers 85. Thus, the upward pivotal movement of the pressing arms 91 is restricted more strongly. The front cover 7 pivotally moved until the opening 5 is closed is locked by a locking mechanism (not shown).

In pulling out the image formation unit 43 from the housing 3, the front cover 7 is pivotally moved downward to open the opening 5 and, then, the image formation unit 43 is pulled out frontward. When the pins 59 abut the raised portions 97 of the pressing arms 91, the pressing arms 91 are pressed by the pins 59 against the first load and thus pivotally moved upward. Then, the pins 59 move away from the raised portions 97 and, thus, the pressing arms 91 pivotally move downward.

To sum up, in the above first embodiment, the compression coil springs 87 are supported by the opening/closing levers 85 and apply a pressing force to the pressing levers 83. The opening/closing levers 85 are provided in the housing 3 in a state where the abutment portions 103 constituting part of the opening/closing levers 85 are extended out of the housing 3. The front cover 7 is provided with the lugs 13 projecting from the surface of the front cover 7 facing the housing 3. The lugs 13 are provided at locations where the front cover 7 abuts the abutment portions 103 of the opening/closing levers 85 while it moves from an open position to a closed position with respect to the housing 3. When the front cover 7 moves to the closed position with the lugs 13 abutting the abutment portions 103, the opening/closing levers 85 pivotally move by the pressing of the lugs 13 against the abutment portions 103 to further elastically deform the compression coil springs 87 and the second load is applied to the pressing levers 83 by the elastic restoring force of the compression coil springs 87.

As thus far described, in the present invention, an appropriate load is applied to the pressing levers 83 in each of an open state and a closed state of the front cover 7. Therefore, even if an external force, such as vibration or impact, is applied to the housing 3, the pivotal movement of the pressing levers 83 can be restricted to prevent unnecessary movement of the pins 59 of the image formation unit 43. Specifically, when the front cover 7 is open, a load is applied to the extent that the pins 59 are not prevented from passing along the cutaways 15, and, thus, the image formation unit 43 can be smoothly pulled out and fitted in. However, even if the pins 50 slightly move, no particular influence is exerted. Furthermore, a greater load is applied to the pressing levers 83 in the state where the front cover 7 is closed. Therefore, even if an external force due to vibration of the housing 3 during image forming operation is applied, the image formation unit 43 can be prevented from falling out of position and, thus, the occurrence of an image defect can be prevented.

Next, a description will be given of a modification of the above-described first embodiment.

Figure 11:
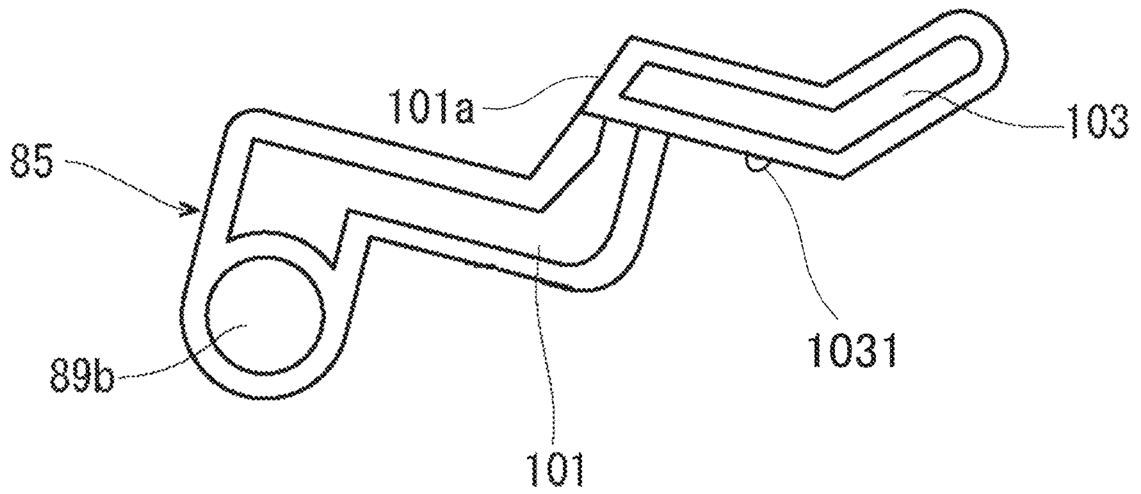
FIG. 11 is a side view showing an opening/closing lever according to a modification of the first embodiment.

FIG. 11 is a side view showing an opening/closing lever 85 according to a modification of the first embodiment. The opening/closing lever 85 according to the modification is different from the opening/closing lever 85 according to the first embodiment in that it is further provided with a projection 1031. In other words, the opening/closing lever 85 according to the modification has the same structure as the opening/closing lever 85 according to the first embodiment except that it is further provided with a projection 1031. On the abutment portion 103 of the opening/closing lever 85, the projection 1031 is provided at a portion of the abutment portion 103 abuttable on the lug 13 of the front cover 7 to project from the portion. The projection 1031 is provided to extend over the entire range (over the entire width) of the above portion of the abutment portion 103 of the opening/closing lever 85 in the widthwise direction (in a direction of the depth of the plane of the figure in FIG. 11).

Figure 12:
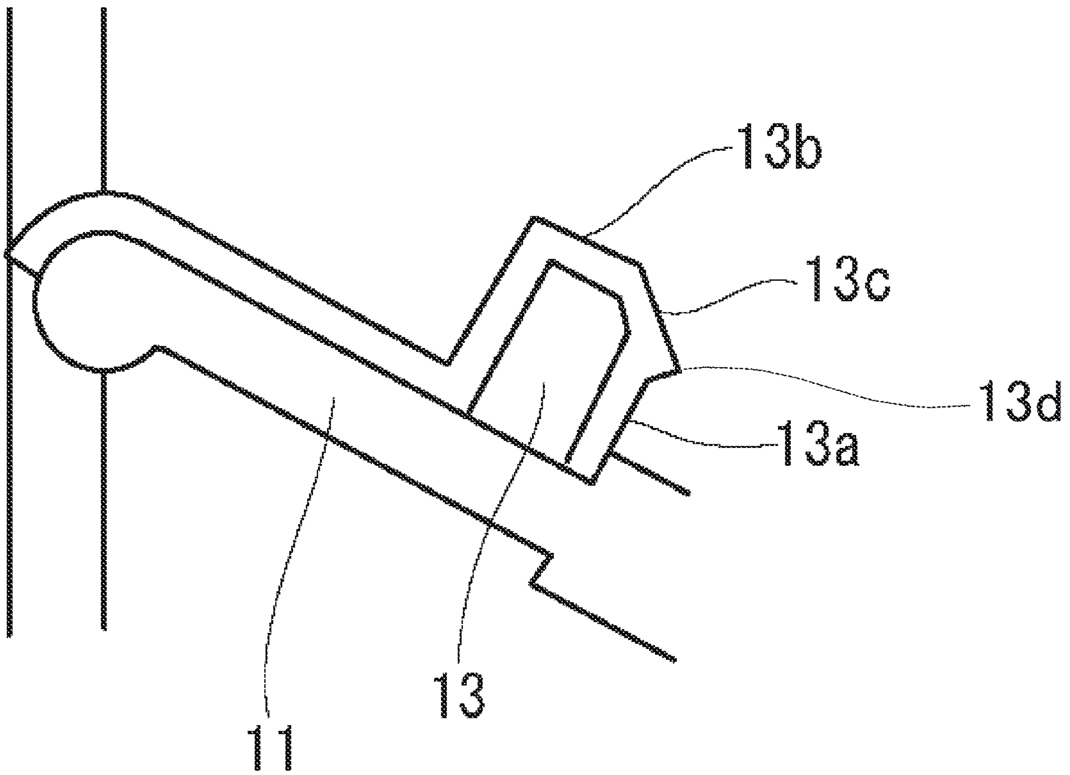
FIG. 12 is a side view in local magnification of a stopper of the front cover.

FIG. 12 is a side view in local magnification of the stopper 11 of the front cover 7. The lug 13 of the front cover 7 is provided, at a portion thereof located facing the abutment portion 103 of the opening/closing lever 85 when the front cover 7 is closed with respect to the housing 3, with an engagement portion 13*d* projecting toward the abutment portion 103. Also in the modification, the stopper 11 and the lug 13 of the front cover 7 are the same as those in the first embodiment as described previously. However, in this modification, the projecting portion of the lug 13 formed between the inclined surface 13*c* and the top surface 13*a* functions as the engagement portion 13*d*.

When the front cover 7 is pivotally moved upward to move from the open position to the closed position with respect to the housing 3, as shown in FIG. 8 above, the abutment portions 103 of the opening/closing levers 85 abut the lugs 13 of the stoppers 11 of the front cover 7 from below. When the front cover 7 is further pivotally moved upward, as shown in FIG. 9 above, the opening/closing levers 85 are pushed up by the lugs 13, thus moved away from the lower restricting portions 89*d*, and start to pivotally move upward. Then, the under surfaces of the abutment portions 103 make sequential contact with the distal end surfaces 13*b*, the inclined surfaces 13*c*, and the top surfaces 13*a* of the lugs 13 in this order.

As the contact of the top surfaces 13*a* of the lug 13 with the under surfaces of the abutment portions 103 progresses, the engagement portions 13*d* make contact with the projections 1031 from external to the housing 3 (the Fr (front) side of the housing 3 in FIG. 9) and, in this state, the engagement portions 13*d* are engaged on the projections 1031 for a moment.

Figure 13:
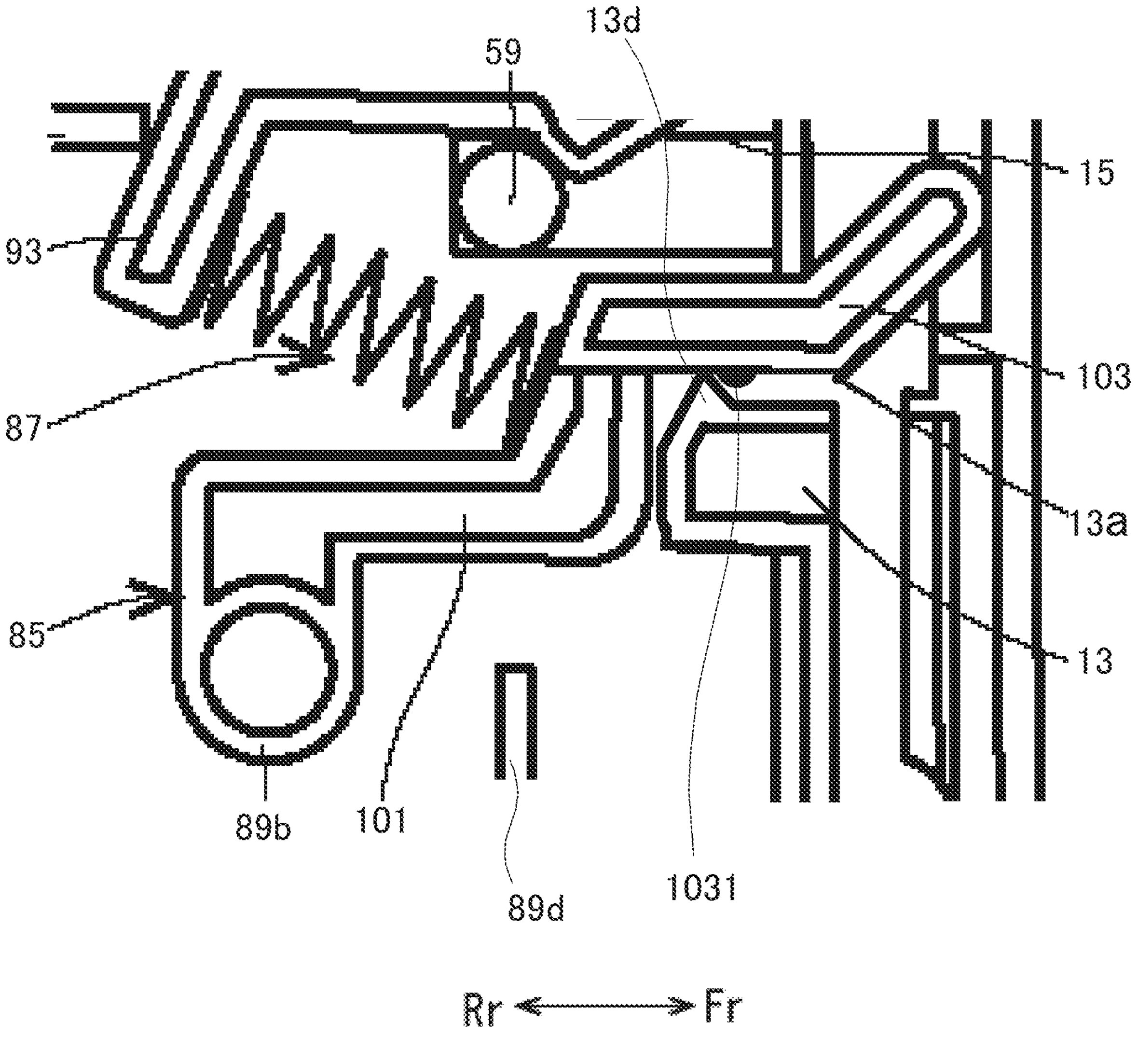
FIG. 13 is a side view showing a restriction mechanism of an image forming apparatus according to a modification of the first embodiment of the present invention when the front cover is closed.

When, after the above engagement, the front cover 7 is further pivotally moved toward the closed position, with the movement of the front cover 7 toward the closed position, as shown in FIG. 13, the engagement portions 13*d* move across the projections 1031 to the Rr (rear) side of the projections 1031 in FIG. 13 and enter the housing 3 inwardly of the projections 1031. Then, when the opening 5 is fully closed by the front cover 7 and the front cover 7 reaches the closed position, the abutment portions 103 climb on the lugs 13 with the engagement portions 13*d* engaged to the projections 1031 from inwardly of the projections 1031 in the housing 3. At this time, the opening/closing levers 85 are pressed downward in FIG. 13 by the compression coil springs 87 and thus held in the position shown in FIG. 13.

When, as just described, the front cover 7 is in the closed position in the modification, the load applied to the pressing levers 83 becomes greater to restrict the movement of the pins 59 and thus prevent the image formation unit 43 from falling out of position and the engagement portions 13_d_ engage to the projections 1031 from inwardly of the projections 1031 in the housing 3 to restrict the pivotal movement of the front cover 7 toward the open position of the front cover 7 and thus hold the closed position of the front cover 7 more stably than in the first embodiment.

Furthermore, since the restriction mechanisms 81 are provided, at respective locations where the stoppers 11 are provided, opposite to the stoppers 11, the engagement of the engagement portions 13_d_ to the projections 1031 in the closed position of the front cover 7 is established in the vicinity of both the lateral ends of the housing 3 when viewed from the front side of the housing 3. Therefore, the front cover 7 is locked at both the lateral ends in a state where it closes up the housing 3. Thus, one-sided closing of the front cover 7, i.e., a state where the front cover 7 is closed only at one of both the lateral ends of the housing 3, can be prevented. Furthermore, since the opening/closing levers 85 in the modification can be constituted by providing the projections 1031 on the opening/closing levers 85 in the first embodiment, stable locking of the front cover 7 to the housing 3 can be achieved without increasing the number of components.

On the other hand, in pivotally moving the front cover 7 from the closed position to the open position, the front cover moves in a direction away from the housing 3 (a direction toward the outside of the housing 3) by the pivotal movement. During the time, with the movement of the front cover 7, the engagement portions 13_d_ engaged to the projections 1031 from inwardly of the projections 1031 in the housing 3 move across the projections 1031 to the Fr (front) side of the projections 1031 in FIG. 13 and, thus, the engagement portions 13_d_ move outwardly of the projections 1031 with respect to the housing 3. During the time, by the pressing force of the engagement portions 13_d_ giving to the projections 1031 when moving across the projections 1031, the opening/closing levers 85 pivotally move upward in FIG. 13 against the pressing of the compression coil springs 87. Thus, the engagement portions 13_d_ can move outwardly of the projections 1031 with respect to the housing 3. Thereafter, like the operation shown in the first embodiment, the front cover 7 pivotally moves to the open position.

Figure 14:
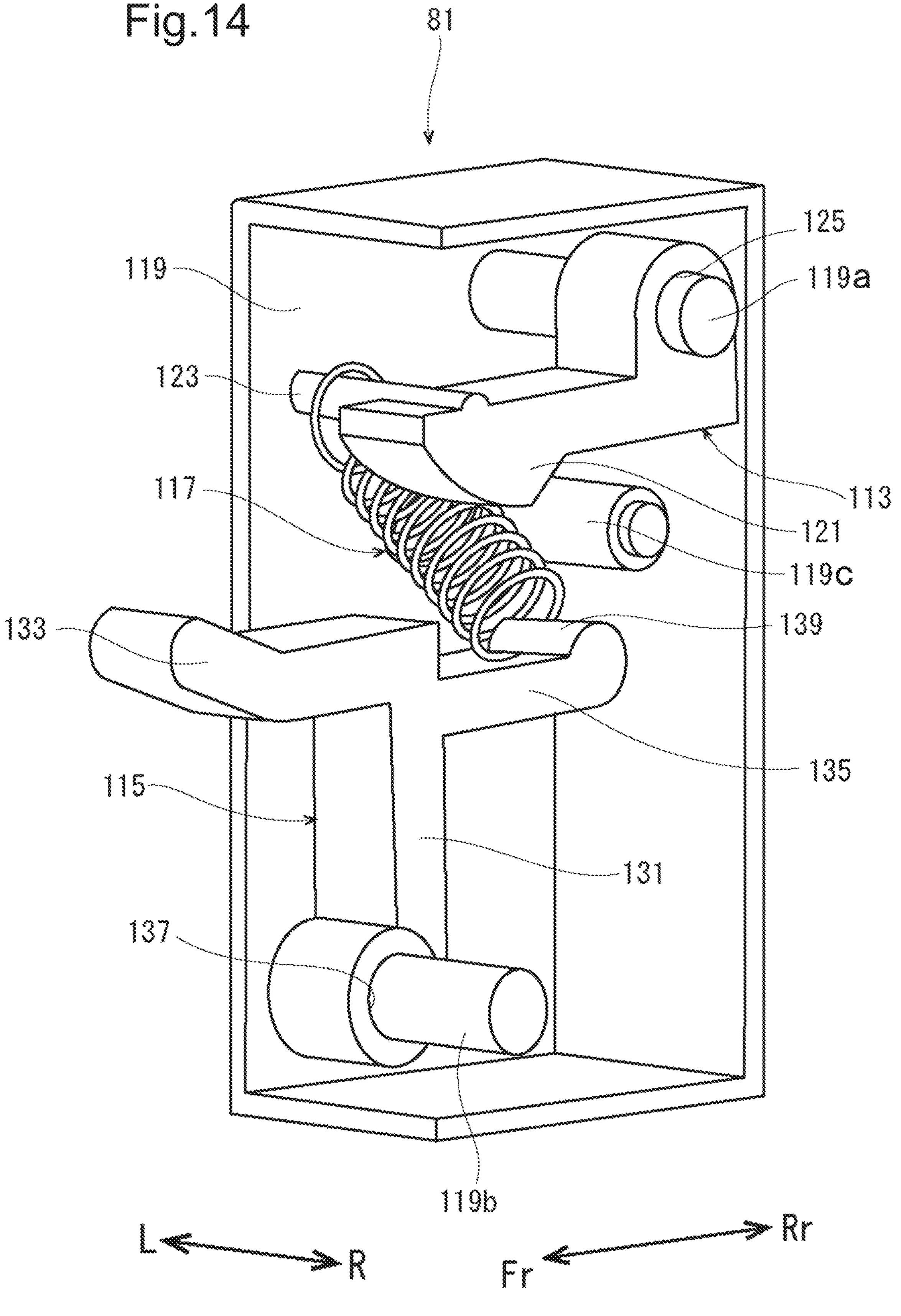
FIG. 14 is a perspective view showing a restriction mechanism of an image forming apparatus according to a second embodiment as an image forming apparatus according to one embodiment of the present invention.
Figure 15:
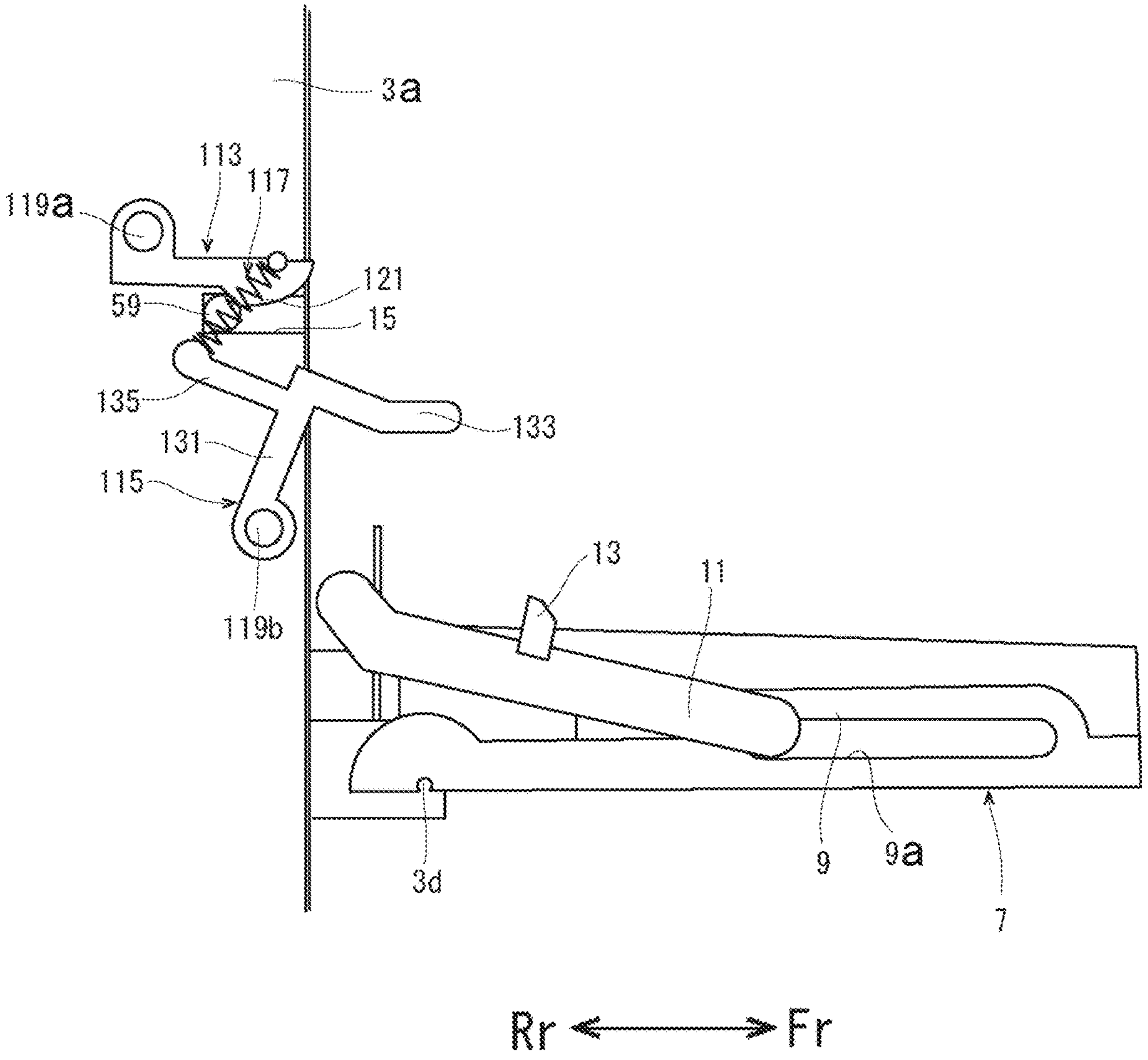
FIG. 15 is a side view showing the restriction mechanism according to the second embodiment in the image forming apparatus according to the one embodiment of the present invention when a front cover is open.
Figure 16:
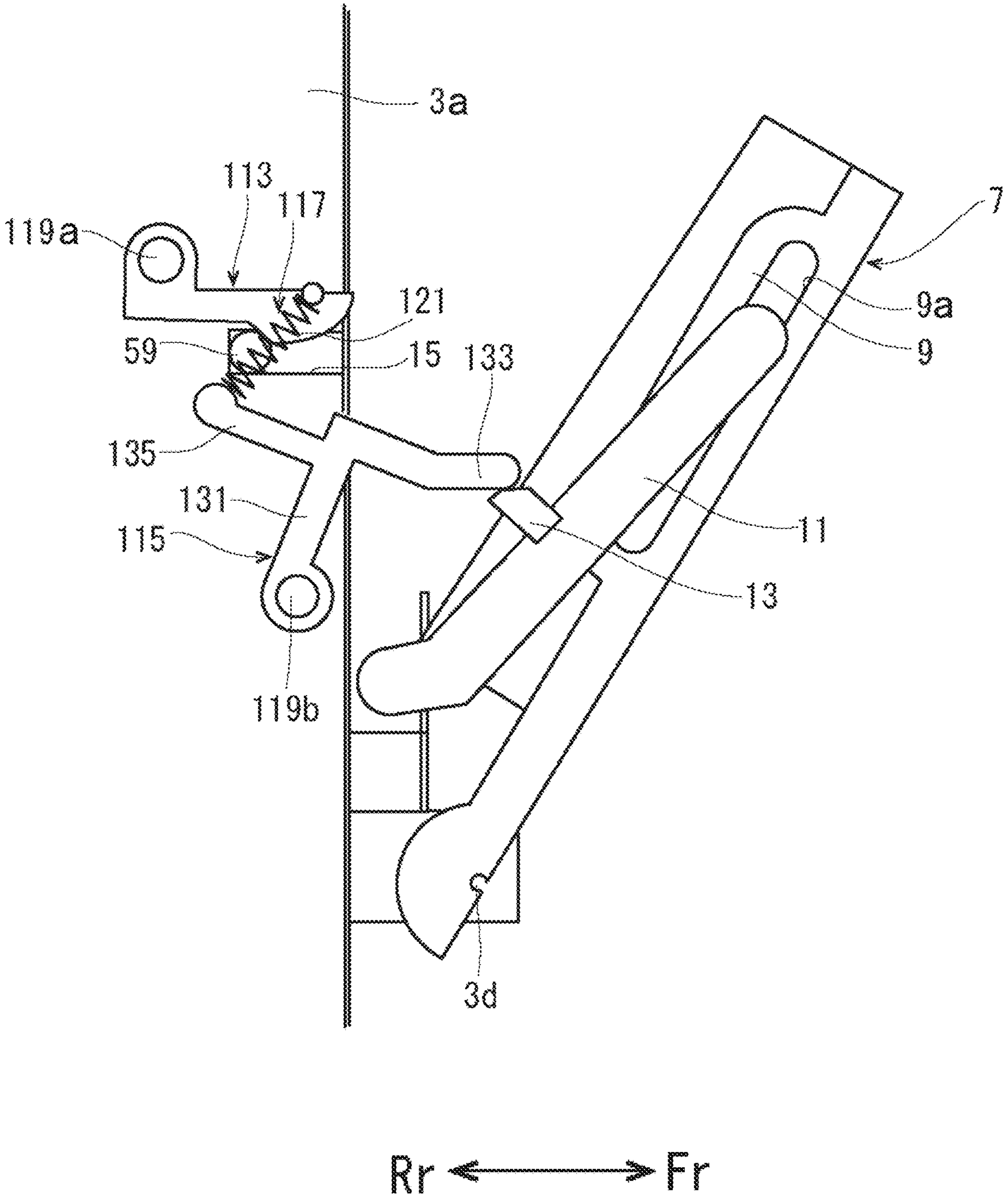
FIG. 16 is a side view showing the restriction mechanism according to the second embodiment in the image forming apparatus according to the one embodiment of the present invention when the front cover is moving toward a closed position.
Figure 17:
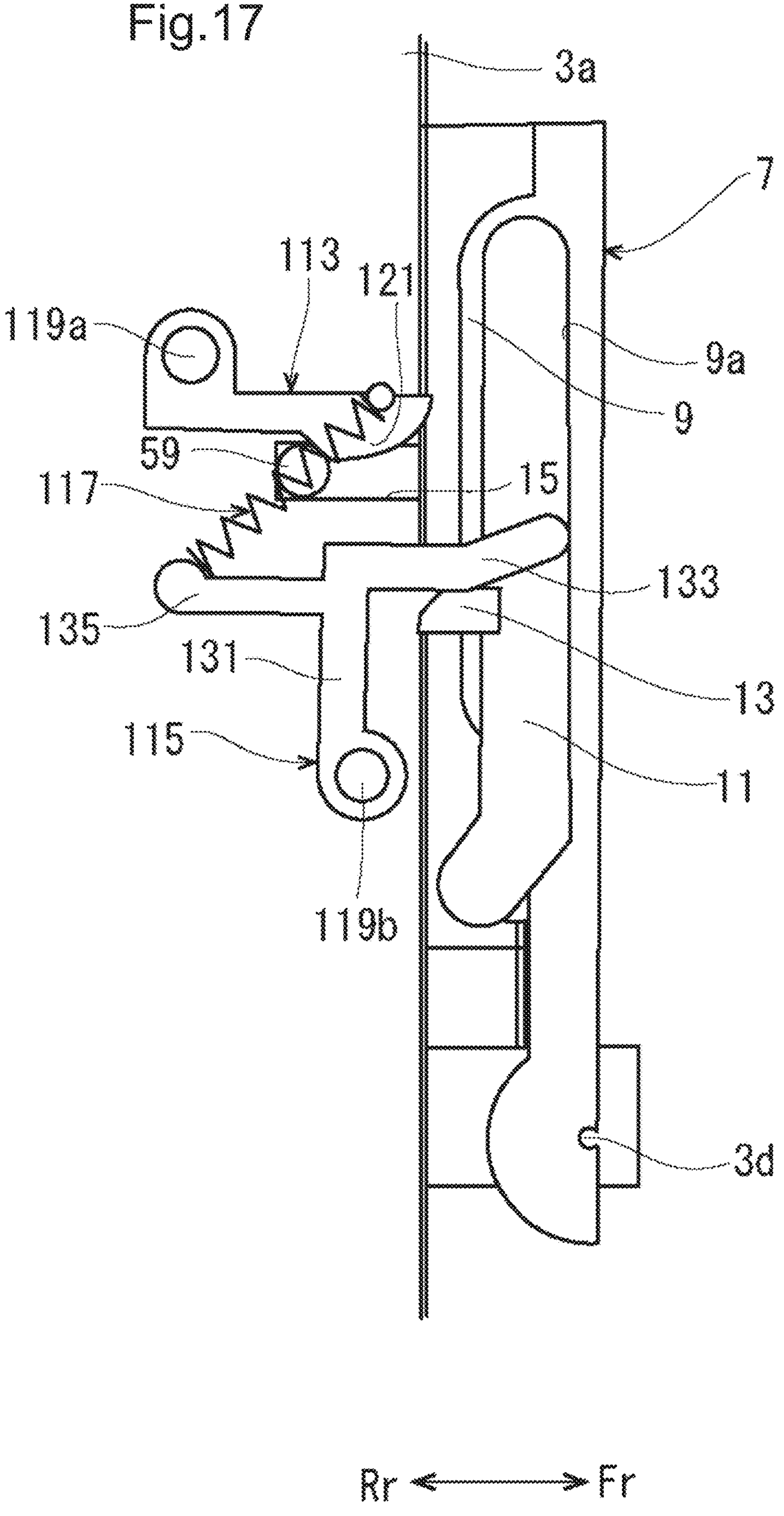
FIG. 17 is a side view showing the restriction mechanism according to the second embodiment in the image forming apparatus according to the one embodiment of the present invention when the front cover is closed.

Next, a description will be given of restriction mechanisms 81 in an image forming apparatus 1 according to a second embodiment with reference to FIGS. 14 to 17. FIG. 14 is a perspective view showing the restriction mechanism 81 and FIGS. 15 to 17 are side views showing the restriction mechanism 81.

As shown in FIG. 14, the restriction mechanism 81 includes a pressing lever 113, an opening/closing lever 115, a tension coil spring 117 serving as an elastic member, and a support plate 119 supporting these components. In other words, in the second embodiment, the tension coil spring 117 is used instead of the compression coil spring 87 in the first embodiment. The following description will be given mainly of different points from the first embodiment.

The pressing lever 113 is a linear member and includes a raised portion 121 formed at a distal end portion thereof and having a triangular shape when viewed from the right-to-left direction. A spring support pin 123 is also formed on the distal end portion of the pressing lever 113. Furthermore, a bearing hole 125 is formed in a basal end portion of the pressing lever 113. The pressing lever 113 is pivotally supported, with the distal end oriented frontward and the raised portion 121 oriented downward, by an upper pivot pin 119_a_ of the support plate 119. The pressing lever 113 abuts an upper restricting portion 119_c_ of the support plate 119 from above and is thus restricted in downward pivotal movement, but allowed for upward pivotal movement.

The opening/closing lever 115 is a member in an approximately T-shape when viewed from the right-to-left direction and includes a support arm 131, and an abutment arm 133 and a restriction arm 135 which extend in directions opposite to each other from the distal end of the support arm 131. A bearing hole 137 is formed in a basal end portion of the support arm 131. A spring support pin 139 is formed on a distal end of the restriction arm 135. The opening/closing lever 115 is pivotally supported, with the abutment arm 133 oriented frontward, by a lower pivot pin 119_b_ of the support plate 119. The restriction arm 135 abuts a lower restricting portion (not shown) of the support plate 119 from above and is thus restricted in downward pivotal movement. Thus, the opening/closing lever 115 is held in a position where the abutment arm 133 extends out frontward beyond the support plate 119.

The tension coil spring 117 is anchored at one end to the spring support pin 123 of the pressing lever 113 and anchored at the other end to the spring support pin 139 of the opening/closing lever 115. Since, as described above, the pressing lever 113 is restricted in downward pivotal movement and the restriction arm 135 of the opening/closing lever 115 is restricted in downward pivotal movement, the positions of both the spring support pins 123, 139 are fixed. The tension coil spring 117 is slightly tensioned between both the spring support pins 123 and 139. Thus, an elastic restoring force of the tension coil spring 117 produced by tensioning thereof is applied to the pressing lever 113 to press the pressing lever 113 against the upper restricting portion 119_c_. In other words, a downward load (a first load) is applied to the pressing lever 113.

In a state where the image formation unit 43 is pulled out of the housing 3, the front cover 7 is opened, the raised portions 121 of the pressing levers 113 project laterally to the cutaways 15 in the right and left side panels 3_a_ from above, and the abutment arms 133 of the opening/closing levers 115 project frontward through the opening 5. When, in the course of entry of the pins 59 of the image formation unit 43 into the cutaways 15 of the right and left side panels 3_a_ during fitting of the image formation unit 43, the rear sides of the pins 59 abut the raised portions 121 of the pressing levers 113 projecting laterally to the cutaways 15, the pressing levers 113 are pressed by the pins 59 against the first load and thus pivotally moved upward. When the pins 59 abut the rear ends (bottoms) of the cutaways 15, the pins 59 pass over the apexes of the raised portions 121 and the pressing levers 113 thus pivotally move downward. Thus, the inclined rear surfaces of the raised portions 121 abut the front sides of the pins 59 from above to press the pins 59 against the rear ends of the cutaways 15, thus restricting the movement of the pins 59. The pressing levers 113 are subjected to the first load along the direction opposite to the direction away from the cutaways 15.

After the image formation unit 43 is fitted into the housing 3, the front cover 7 is pivotally moved upward in order to close the opening 5. When the front cover 7 is pivotally moved upward, as shown in FIG. 16, the abutment arms 133 of the opening/closing levers 115 abut the lugs 13 of the stoppers 11 of the front cover 7 from below. Specifically, the distal end surfaces 13_b_ (see FIG. 6) of the lugs 13 abut the under surfaces of the abutment arms 133. When the front cover 7 is further pivotally moved upward, the opening/closing levers 115 are pushed up by the lugs 13, thus moved away from the lower restricting portions, and start to pivotally move upward. When the opening 5 is fully closed by the front cover 7 as shown in FIG. 17, the abutment arms 133 climb on the lugs 13.

To sum up, the tension coil springs 117 are supported by the opening/closing levers 115 and apply to the pressing levers 113 a force to draw the pressing levers 113. The opening/closing levers 115 are provided in the housing 3 in a state where the abutment arm 133 constituting part of the opening/closing levers 115 are extended out of the housing 3. The front cover 7 is provided with the lugs 13 projecting from the surface of the front cover 7 facing the housing 3. The lugs 13 are provided at locations where the front cover 7 abuts the abutment arm 133 of the opening/closing levers 115 while it moves from an open position to a closed position with respect to the housing 3. In the second embodiment, when the front cover 7 moves to the closed position with the lugs 13 abutting the abutment arm 133, the opening/closing levers 115 pivotally move by the pressing of the lugs 13 against the abutment arm 133 to further elastically deform the tension coil springs 117 in a stretching direction thereof and the second load is applied to the pressing levers 113 by the elastic restoring force of the tension coil springs 117.

When the opening/closing levers 115 pivotally moves upward in this manner, the tension coil springs 117 start to be tensioned between both the spring support pins 123 and 139. Thus, the elastic restoring force (load) of the tension coil springs 117 produced by the tensioning thereof increases, resulting in an increased load applied to the pressing levers 113. This load is referred to as a second load. The second load is greater than the first load. Thus, the upward pivotal movement of the pressing levers 113 is restricted more strongly.

As described so far, also in the restriction mechanisms 81 according to the second embodiment, an appropriate load is applied to the pressing levers 113 in each of a closed state and an open state of the front cover 7. Therefore, even if an external force, such as vibration or impact, is applied to the housing 3, the pivotal movement of the pressing levers 113 is restricted to prevent unnecessary movement of the pins 59 of the image formation unit 43.

Regarding the present invention, the description has heretofore been given of particular embodiments. However, the present invention is not limited to the above embodiments. Those skilled in the art can modify the above embodiments without departing from the scope and gist of the invention.

The invention claimed is:

1. An image forming apparatus comprising:

a housing with an opening in a side surface thereof;

a cover capable of opening and closing the opening;

an image formation unit disposed in an interior of the housing and capable of being pulled out through the opening along a predetermined direction of pullout;

a cutaway formed at a lateral edge of the opening along the direction of pullout;

a pin provided on the image formation unit and capable of abutting against a bottom of the cutaway to position the image formation unit with respect to the housing; and a restriction mechanism that restricts movement of the pin within the cutaway, wherein the restriction mechanism comprises:

a pressing lever pivotally movable from a position of abutment on the pin at lateral to the cutaway toward a direction away from the cutaway;

an opening/closing lever pivotally movable with a closing movement of the cover; and an elastic member disposed in an elastically deformed state between the pressing lever and the opening/closing lever to apply to the pressing lever a load opposite to the direction away from the cutaway, wherein when the cover is open, an elastic restoring force of the elastic member causes a first load to be applied to the pressing lever, and wherein when the cover is closed, the opening/closing lever pivotally moves to further elastically deform the elastic member and, thus, an elastic restoring force of the elastic member causes a second load greater than the first load to be applied to the pressing lever.

2. The image forming apparatus according to claim 1, wherein the elastic member is a compression coil spring that is supported by the opening/closing lever and applies a pressing force to the pressing lever, the opening/closing lever is provided within the housing in a state where an abutment portion constituting part of the opening/closing lever is extended out of the housing, the cover is provided with a lug that projects from a surface of the cover facing the housing, the lug is provided at a location on the cover where the lug abuts the abutment portion of the opening/closing lever during movement of the cover from an open position to a closed position with respect to the housing, and when the cover moves to the closed position with the lug abutting the abutment portion, the opening/closing lever is pivotally moved by pressing of the lug against the abutment portion to further elastically deform the elastic member and the second load is applied to the pressing lever by the elastic restoring force of the elastic member.

3. The image forming apparatus according to claim 2, wherein the abutment portion of the opening/closing lever is provided, at a portion abuttable on the lug of the cover, with a projection projecting from the abuttable portion, the lug of the cover is provided, at a portion located facing the abutment portion when the cover is in the closed position, with an engagement portion projecting toward the abutment portion, when, during movement of the cover from the open position to the closed position with respect to the housing, the lug abuts the abutment portion to pivotally move the opening/closing lever, the engagement portion makes contact with the projection from external to the housing to engage the engagement portion on the projection for a moment and then, with the movement of the cover toward the close position, moves across the projection and enters the housing inwardly of the projection, and when the cover is in the closed position, the engagement portion is engaged to the projection from inwardly of the projection in the housing.

4. The image forming apparatus according to claim 1, wherein the elastic member is a tension coil spring that is supported by the opening/closing lever and applies to the pressing lever a force to draw the pressing lever, the opening/closing lever is provided within the housing in a state where an abutment portion constituting part of the opening/closing lever is extended out of the housing, the cover is provided with a lug that projects from a surface of the cover facing the housing, the lug is provided at a location on the cover where the lug abuts the abutment portion of the opening/closing lever during movement of the cover from an open position to a closed position with respect to the housing, and when the cover moves to the closed position with the lug abutting the abutment portion, the opening/closing lever is pivotally moved by pressing of the lug against the abutment portion to elastically deform the elastic member in a stretching direction thereof and the second load is applied to the pressing lever by the elastic restoring force of the elastic member.

* * * * *